US006220327B1

(12) United States Patent
Rothwell et al.

(10) Patent No.: US 6,220,327 B1
(45) **Date of Patent: *Apr. 24, 2001**

(54) APPARATUS FOR AUTOMATED PRINTING AND ASSEMBLY OF PASSPORT BOOKLETS

(75) Inventors: Christian S. Rothwell, North Kingstown; Joseph V. Connors, Warwick; Raymond E. Maynard, Westerly, all of RI (US)

(73) Assignee: Atlantek, Inc., Wakefield, RI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,128

(22) Filed: Apr. 27, 1998

(51) Int. Cl.[7] .................................................... B32B 31/00

(52) U.S. Cl. ......................... 156/387; 156/256; 156/270; 156/277; 156/308.2; 156/517; 156/521; 156/556; 156/583.1; 283/70; 283/75; 283/77; 283/109; 283/112; 281/38; 281/15.1; 347/171

(58) Field of Search .................................... 156/517, 566, 156/556, 521, 387, 256, 270, 277, 583.1, 308.2; 283/109, 75, 77, 70, 112; 281/38, 15.1; 347/171

(56) References Cited

U.S. PATENT DOCUMENTS 4,416,719 * 11/1983 Horiuchi ............................. 156/359
4,911,478 3/1990 Oshikoshi ............................ 283/109
5,011,570 * 4/1991 Ohbayashi ........................... 156/310
5,211,424 5/1993 Bliss ................................... 281/15.1
5,565,902 * 10/1996 Nardone et al. ..................... 347/170
5,637,174 6/1997 Field et al. ........................... 156/256
5,788,796 * 8/1998 Look et al. .......................... 156/277
5,843,272 * 12/1998 DeVale et al. ....................... 156/542
5,874,145 2/1999 Walker ................................ 428/42.1
5,897,144 4/1999 Uno ....................................... 283/77

* cited by examiner

*Primary Examiner*—Linda Gray
(74) *Attorney, Agent, or Firm*—Barlow, Josephs & Holmes, Ltd.

(57) ABSTRACT

An identification booklet including a backing and a printed cover film having identification indicia printed thereon is automatically printed and assembled by an apparatus including means for holding the booklet in an open position with the backing exposed, printing means for printing indicia onto an inner surface of the cover film, transport means including an insertion blade rotatably mounted thereon, the insertion blade including a damp for holding the cover film in place thereon, die-cut means for cutting the cover film to a predetermined size while the cover film is held in place on the insertion blade by the clamp, to form the identification card and fusing means for fusing the identification card and the backing together. The insertion blade is rotated while the transport means transports the insertion blade with the identification card clamped thereto into the booklet, with the identification card contacting the backing, the transport means pushes the booklet into the fusing means with the insertion blade, and the fusing means fuses the identification card to the backing.

20 Claims, 15 Drawing Sheets

APPARATUS FOR AUTOMATED PRINTING AND ASSEMBLY OF PASSPORT BOOKLETS

BACKGROUND OF THE INVENTION

1. Field of the Invention

The present invention relates to automated apparatus for printing and assembling travel documents, such as passport booklets, and more particularly to an automated system for instant, one-up custom printing, die-cutting and fusion of an identification card in a passport booklet, to form a data page in the booklet.

2. Discussion of the Related Art

Traditional identification booklets, such as passport booklets, typically comprise a number of paper pages bound to a cover made from a paper stock which is heavier than the inside pages. Identification information is typed or printed onto the inside of the cover of the booklet and a photographic insert is laminated to the inside cover. The photographic insert typically comprises a die-cut sheet of Polaroid instant film wherein a photograph of the passport holder is optically superimposed over the inside cover of the booklet having the booklet holder's personal information typed or printed thereon. A laminate sheet is placed over the inside cover and then fed into a roll laminator, wherein the photographic image is sealed between the laminate and the inside cover of the booklet. In most cases, multiple photographs are exposed on a single sheet of photographic film in order to reduce waste of the expensive instant photographic material, and thereby reduce the per booklet cost of production. In other systems, a plurality of booklet holder's photographs are taken in 35 mm format, and then combined with the booklets having their corresponding printed identification information at central issuance centers. Central issuance of identification booklets has been found to be efficient as well as cost effective. However, the current system for producing passports is labor intensive and slow, often resulting in delays in receiving booklets, as well as the potential to incorrectly match personal information with the correct photograph. Furthermore, the central issuance system discourages the production of cards in small batches, as well as the custom production of individual booklets when replacements are necessary. While the above technologies are effective for their intended purpose, it has been found that there is an increasing need in the industry for an automated system which automatically prints and die-cuts identification cards and fuses them inside an identification booklet in an instant, one-up format, wherein a single identification booklet can be easily and inexpensively produced, with very little labor involved, in a single apparatus.

SUMMARY OF THE INVENTION

The present invention provides a system for the automated production of identification booklets, such as passports, comprising a two-part thermoplastic security media and apparatus for printing, die-cutting and fusing of the security media into the booklets. The security media comprises an opaque thermoplastic backing film which is bound into the binder of the booklet. The backing film essentially forms a page in the booklet. The security media also comprises a transparent thermoplastic cover film which acts as a receptor for receiving a thermally printed digital image. More specifically, the backing film preferably comprises a white amorphous copolyester film, while the cover film preferably comprises a clear polyvinyl chloride film. In general, the apparatus consists of a thermal printing apparatus for printing the digital image onto the cover film, die-cutting means for die-cutting a predetermined size identification card from the cover film, means for transporting the identification card into contact with the backing film within the booklet and means for fusing the identification card to the backing film. The cover film is provided in roll format wherein a continuous web comprises the clear cover film. The thermal printing apparatus is based on a digital imaging system wherein a digital portrait of the booklet holder is combined by custom computer software with a background, booklet holder signature and alphanumeric text to produce a complete digital full-color card image. A thermal web printer is operative for printing the color card image onto an inner surface of the cover film adjacent a terminal end of the cover film web. The computer software automatically mirrors the card image so that it appears in its correct orientation when viewed through the top of the cover film. The thermal web printer preferably comprises a thermal dye-transfer printer apparatus having a reverse print direction for printing from a midpoint of the web toward a terminal end thereof. The printed terminal end of the cover film is advanced through a guide to a cutting station where it is clamped and severed from the web, wherein the film is cut to include rounded comers on one edge. A tilt tray, having the cover film clamped thereto, is tilted to a vertical orientation and transported into contact with the backing film of the booklet, which is held in place below the tilt tray. Once the identification card is brought into contact with the backing film, the tilt tray pushes the booklet, including the identification card, into a laminating station including a heated input roller pair for initial laminating of the backing and cover films, a heated platen for heat-fusing the laminated films together and a pair of exit nips for removing the booklet from the laminating station. The result is a custom printed passport booklet which is produced in a minimal amount of time.

In one embodiment of the present invention, an automated apparatus for fusing an identification card to a backing is disclosed. The apparatus comprises fusing means for fusing the identification card and the backing together, transport means including a rotatable blade and clamp means disposed on the rotatable blade, for clamping the identification card to the rotatable blade. The transport means causes the rotatable blade to rotate, transports the rotatable blade into contact with the backing, with the identification card being disposed therebetween, and transports the identification card and backing into the fusing means, wherein the identification card and the backing are fused together.

In another embodiment of the present invention, an apparatus for forming and attaching an identification card comprising a cover film in a booklet having a backing is disclosed. The apparatus comprises means for holding the booklet in an open position with the backing exposed, printing means for printing indicia onto an inner surface of the cover film, transport means including an insertion blade rotatably mounted thereon, the insertion blade including a damp for holding the cover film in place thereon, die-cut means for cutting the cover film to a predetermined size while the cover film is held in place on the insertion blade by the clamp, to form the identification card and fusing means for fusing the identification card and the backing together. The insertion blade is rotated while the transport means transports the insertion blade with the identification card clamped thereto into the booklet, with the identification card contacting the backing, the transport means pushes the booklet into the fusing means with the insertion blade, and the fusing means fuses the identification card to the backing.

In yet another embodiment of the present invention, a method of forming and attaching an identification card comprising a cover film in a booklet having a backing attached therein. The method comprises the steps of printing identification information on the cover film, cutting the cover film to a predetermined size to form the identification card, inserting the identification card into the booklet adjacent the backing and applying heat to the booklet to fuse the identification card and the backing together within the booklet.

BRIEF DESCRIPTION OF THE DRAWINGS

In the drawings which illustrate the best mode presently contemplated for carrying out the present invention.

DETAILED DESCRIPTION

Figure 1:
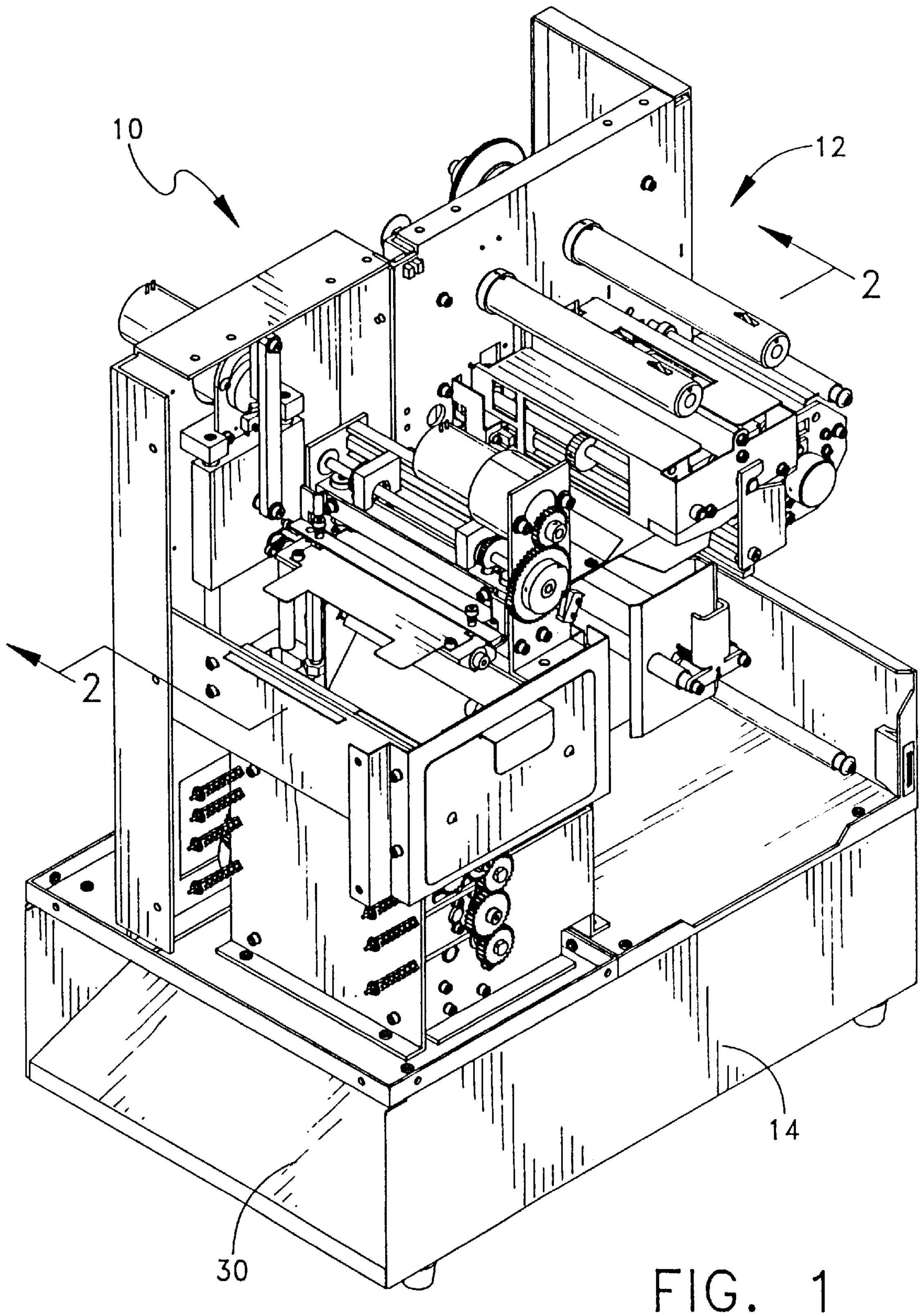
FIG. 1 is a perspective view of the identification booklet production apparatus of the present invention, including the web printer.

Referring now to the drawings, the apparatus of the present invention is illustrated and generally indicated at 10 in FIGS. 1–7. As will hereinafter be more fully described, the present apparatus 10 is operative for the automated production of a passport booklet from a two-part security media. The security media preferably comprises a proprietary media developed by Minnesota Mining and Manufacturing Company of St. Paul, Minn., comprising a thermoplastic cover film for receiving a thermally printed, computer generated digital image and an opaque thermoplastic backing film. The specific properties of the cover film and backing film are set forth in commonly-owned U.S. Pat. No. 5,637,174, the disclosure of which is herein incorporated by reference in its entirety. In the present invention, the backing film is bound into a booklet, thereby forming one of the pages of the booklet from the backing film. In the preferred embodiment, the booklet is a passport, whereby the backing film is glued or sewn into the binder of the passport as the first page of the passport.

The printer 12 shown in FIG. 1 is a thermal web printer of the type disclosed in commonly-owned U.S. Pat. No. 5,565,902, the disclosure of which is herein incorporated by reference in its entirety. The printer 12 prints the identification information and image on the inner surface of the cover film, preferably in a reverse printing direction, i.e. the printing is done from a midpoint of the web to a terminal end. This reverse printing method ensures that little or no media is wasted at the terminal ends due to leader loss as found in conventional forward-driven printing methods.

Figure 2:
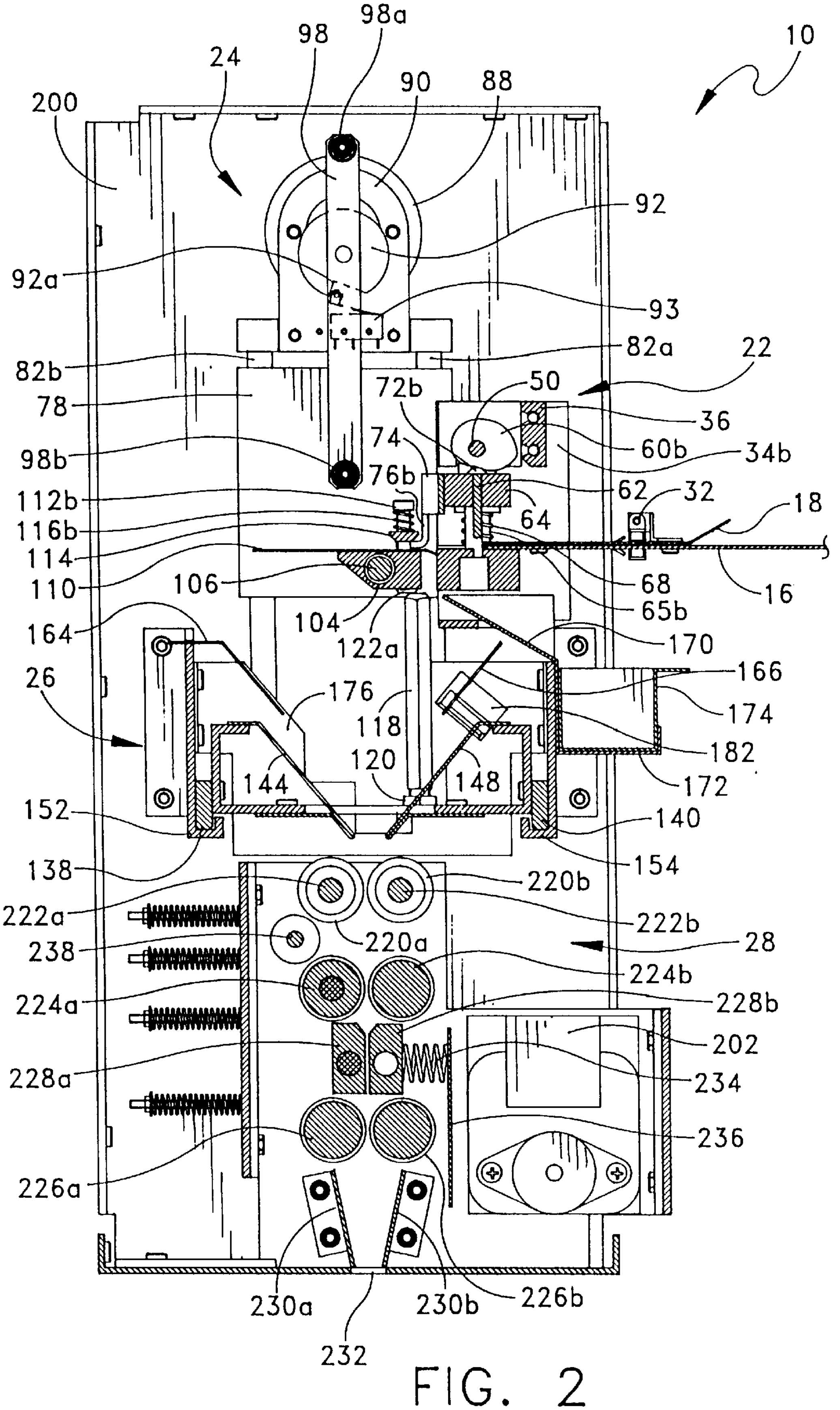
FIG. 2 is a cross-sectional view of the apparatus of the present invention, taken at approximately half the depth of the apparatus.

Referring now to FIG. 2, which is a cross-sectional view of the apparatus, the cross-section taken at approximately half the depth of the apparatus, the configuration of the apparatus will be described. For simplicity, thermal printer 12 and pedestal 14 are not shown in FIG. 2. After the cover film is printed in printer 12, the cover film is guided by lower and upper media guides 16 and 18 of a die-cutting station 22, where the cover film web is cut into an identification card of a predetermined size. Die-cutting station 22 is described in detail below with reference to FIGS. 8 and 9. A transport station 24 receives the cover film web, clamps it in place as it is cut in die-cutting station 22, and transports the identification card into a booklet drawer system 26, which holds a booklet in place with the booklet held open to allow the identification card to be inserted into the booklet in contact with the backing film bound in the booklet. Transport station 26 is described in detail below with reference to FIG. 14 and drawer system 26 is described in detail below with reference to FIGS. 12 and 13. Once the identification card is received in the booklet, the booklet is inserted into laminating station 28, where the identification card and the backing film are fused together within the booklet. Laminating station 28 is described in detail below with reference to FIGS. 2, 10 and 11. After the identification card is fused to the backing film in laminating station 28, the booklet is ejected from laminating station 28 and is retrieved via exit chute 30 of pedestal 14 (FIG. 1).

Figure 8:
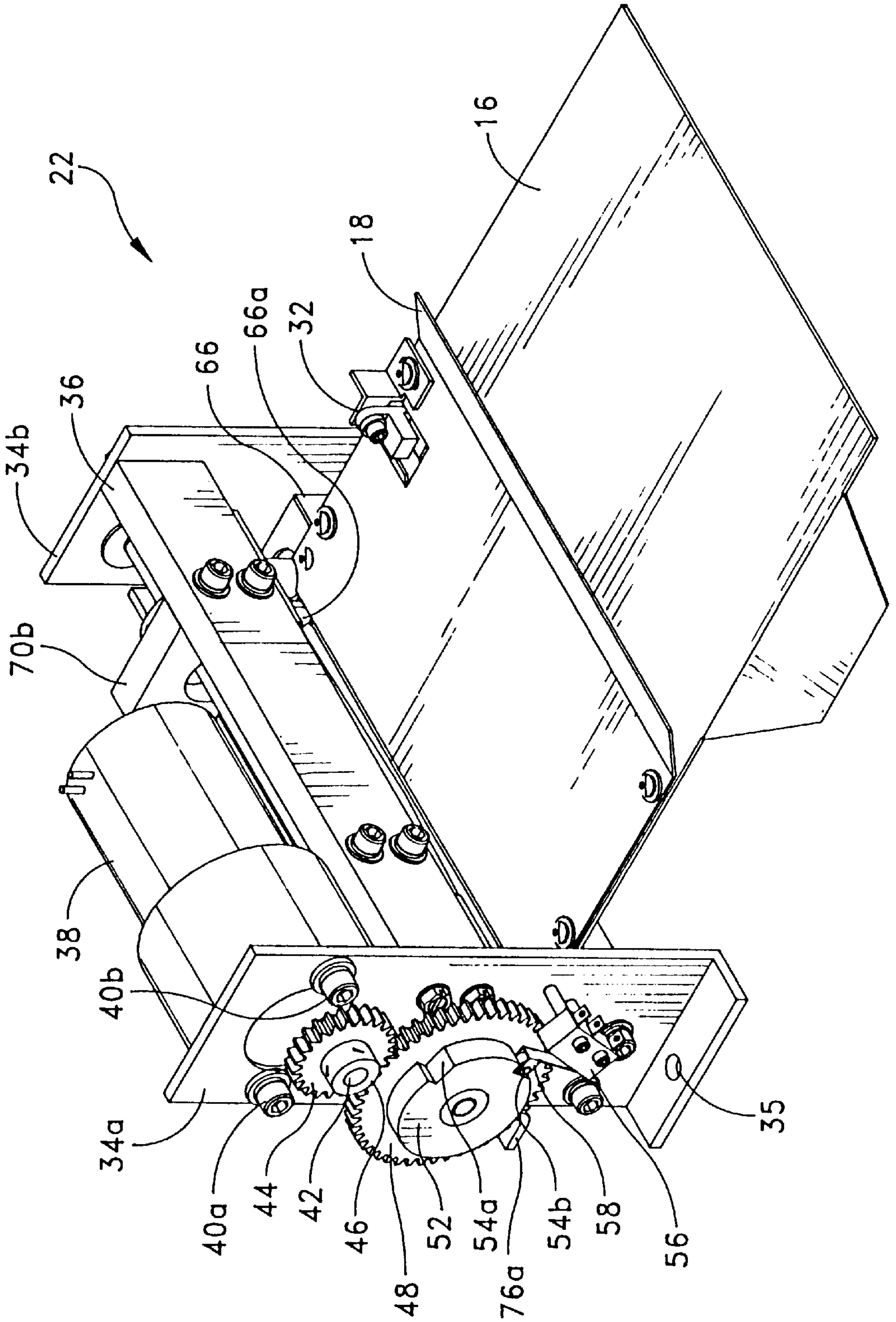
FIG. 8 is a right side perspective view of the die-cut station of the apparatus of the present invention.
Figure 9:
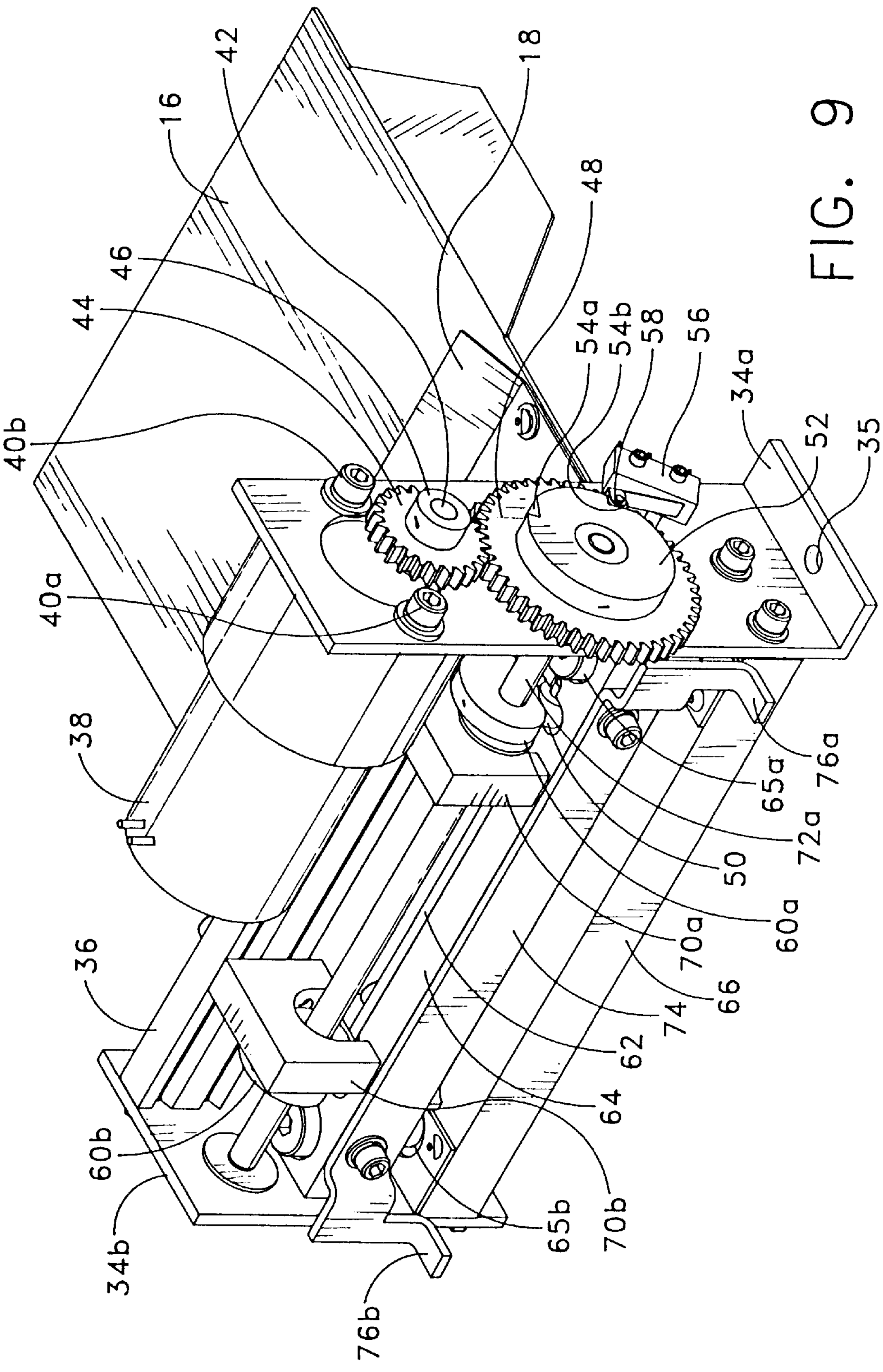
FIG. 9 is a left side perspective view of the die-cut station of the apparatus of the present invention.

Referring now to FIGS. 8 and 9, the die-cutting station 22 will be described. Die-cutting station 22 includes lower media guide 16 and upper media guide 18. A splice sensor 32 optically determines when a splice in the cover film web is present, as when two rolls of cover film have been spliced together. When a splice is present, the spliced portion of the cover film is advanced by the printer 12 through die-cutting station 22, so that the splice can be cut out by the die 62, described below, and ejected from the apparatus. Die-cutting station 22 includes brackets 34*a* and 34*b* which are mounted together by a beam 36. Brackets 34*a* and 34*b* mount the die-cutting station 22 to the apparatus 10 through bolt opening 35 in bracket 34*a* and a similar bolt opening (not shown) in bracket 34*b*. A DC motor 38 is mounted to bracket 34*a* by bolts 40*a* and 40*b*. DC motor 38 includes a drive shaft 42 on which a drive gear 44 is mounted and held in place by locking device 46. Drive gear 44 meshes with and drives a secondary gear 48 which is mounted on a camshaft 50. Secondary gear 48 is cooperatively mounted to a two position cam 52, including detents 54*a* and 54*b*. Also mounted on camshaft 50 are die-actuating cams 60*a* and 60*b*. Die 62 is mounted in a die holder 64, which rides on columns 65*a* and 65*b*, which are mounted on brace 66, having a slot 66*a*, through which die 62 passes and through which scrap pieces, which are punched out of the cover film by die 62, pass. Brace 66 is mounted between brackets 34*a* and 34*b*. Die holder 64 is biased in an upward position against stops 70*a* and 70*b*, which are mounted to beam 36, by springs which are mounted around each of columns 65*a* and 65*b* between die holder 64 and brace 66. One of the springs is indicated by reference numeral 68 in FIG. 2. Die holder 64 includes cam followers 72*a* and 72*b*, which are in direct contact with die-actuating cams 60*a* and 60*b*. A die position sensor 56 includes a mechanical sensor 58 which rides along the outer surface of two position cam 52 and mechanically senses the position of the die 62 by engaging detents 54*a* and 54*b*. A clamp-actuating bar 74, including fingers 76*a* and 76*b* is mounted to die holder 64. The operation of two position cam 52, die position sensor 56 and damp-actuating bar 74 is described below.

Figure 14:
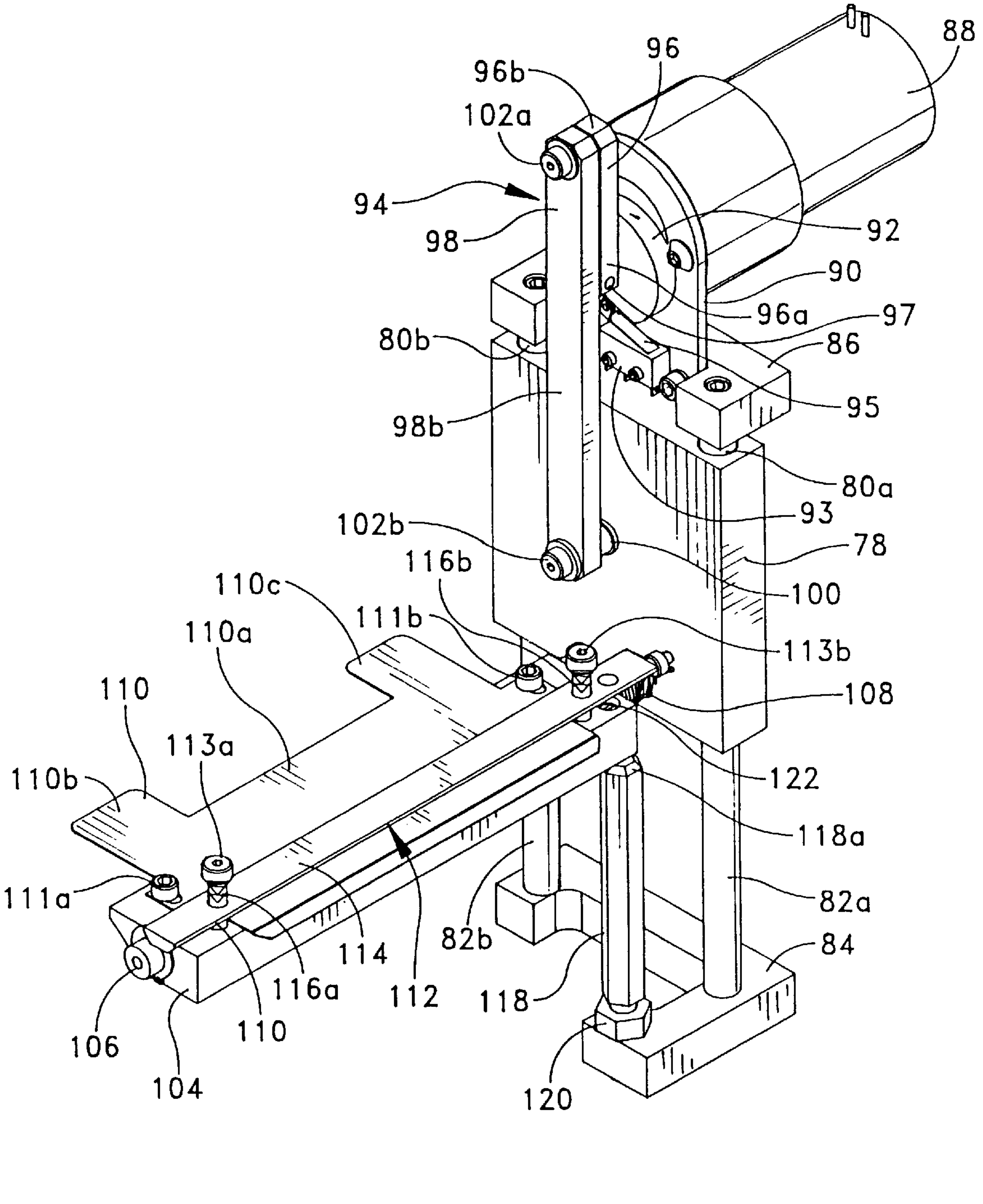
FIG. 14 is a right front perspective view of the transport station of the apparatus of the present invention.

Transport station 24 will now be described with reference to FIGS. 2 and 14. Transport station 24 includes a vertical slide carriage 78 having bores 80*a* and 80*b* for receiving vertical slide rails 82*a* and 82*b*. Vertical slide rails 82*a* and 82*b* are mounted between a base 84 and a truss 86. A DC motor 88 is mounted to truss 86 via a plate 90. Motor 88 drives includes a drive shaft (not shown) on which a one-stop cam 92, including a detent 92*a*, is mounted. A vertical slide carriage position switch 93 is mounted to plate 90 and includes a mechanical sensor 95 which is biased to maintain contact with the outer surface of one-stop cam 92 and to engage detent 92*a*. Mechanical sensor 95 is in an open position when engaged with detent 92*a* and is in a closed position when the transport is moving and mechanical sensor 95 is biased against the outer surface of one-stop cam 92. Linkage system 94 comprises a primary link 96 which is mounted at one end 96*a* on the drive shaft of motor 88 and which is rotatably mounted at a distal end 96*b* to a secondary link 98 at one end 98*a* thereof by a mounting device 102*a*. Distal end 98*b* of secondary link 98 is rotatably mounted to vertical slide carriage 78 at a center bore 100 thereof by a mounting device 102*b*. Ends 98*a* and 98*b* of link 98 may be mounted to link 96 and carriage 78 with any of a number of mounting devices known in the art, which will allow the ends 98*a* and 98*b* to rotate about the mounting devices 102*a* and 102*b*.

Transport station 24 further includes a tilt tray 104 which is rotatably mounted on a shaft 106 which in turn is mounted to vertical slide carriage 78. Tilt tray 104 is biased in the horizontal position shown in FIG. 14 by a spring 108. A blade 110 is adjustably mounted to the top surface of tilt tray 104 via bolts 111*a* and 111*b*, and includes a main body portion 110*a* and two extensions 110*b* and 110*c* disposed at either end of main body portion 110*a*. A clamping device 112 is mounted on tilt tray 104 and includes a pair of mounting shafts 113*a* and 113*b*, which hold damp bar 114 in place. Springs 116*a* and 116*b*, which are mounted on shafts 112*a* and 112*b*, respectively, bias clamp bar 114 downwardly, against blade 110. A tilt tray actuator shaft 118, having a beveled top end 118*a*, is mounted to base 84 in such a way to enable the shaft 118 to be adjusted vertically. Preferably, shaft 118 includes a threaded end (not shown) which is threaded into base 84. The vertical positioning of shaft 118 is adjusted by threading the shaft 118 into base 84 to lower shaft 118 and by threading shaft 118 out from base 84 to raise shaft 118. Once the shaft 118 is at the desired height, a lock nut 120 is tightened against base 84 to prevent shaft 118 from turning. The adjustability of the height of shaft 118 enables the tilt tray 104 and blade 110 to be adjusted in order to keep blade 110 horizontal. A set screw 122 is threaded into tilt tray 104, which enables the tilt tray 104 to be adjusted in order to keep tilt tray 104 perpendicular with respect to vertical slide carriage 78. A bottom portion 122*a* of set screw 122 abuts with the top end 118*a* of shaft 118, so that when set screw 122 is threaded into tilt tray 104, tilt tray 104 is pivotally raised, and when set screw 122 is threaded out of tilt tray 104, tilt tray 104 is pivotally lowered.

Figure 12:
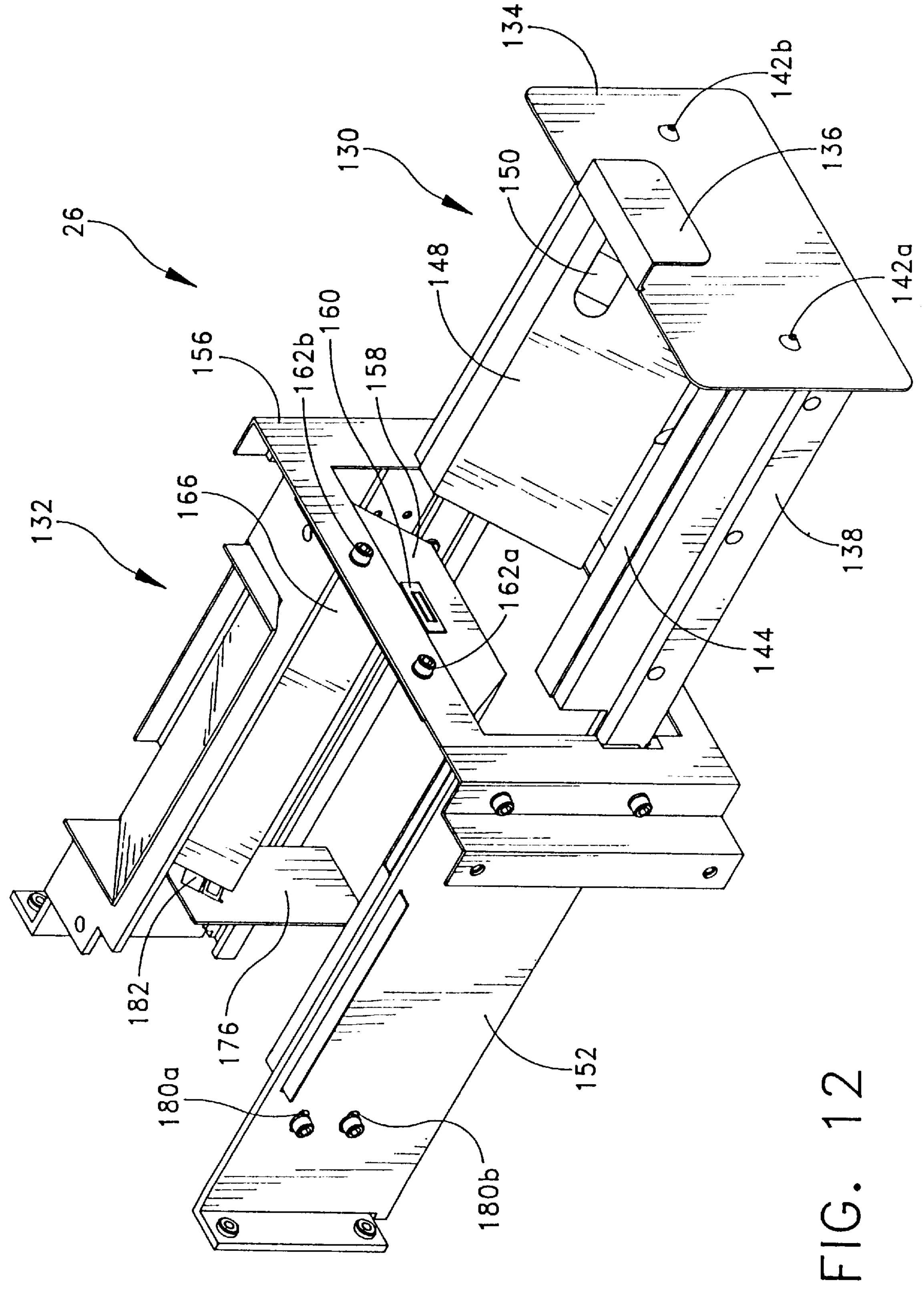
FIG. 12 is a left front perspective view of the booklet drawer system of the apparatus of the present invention.
Figure 13:
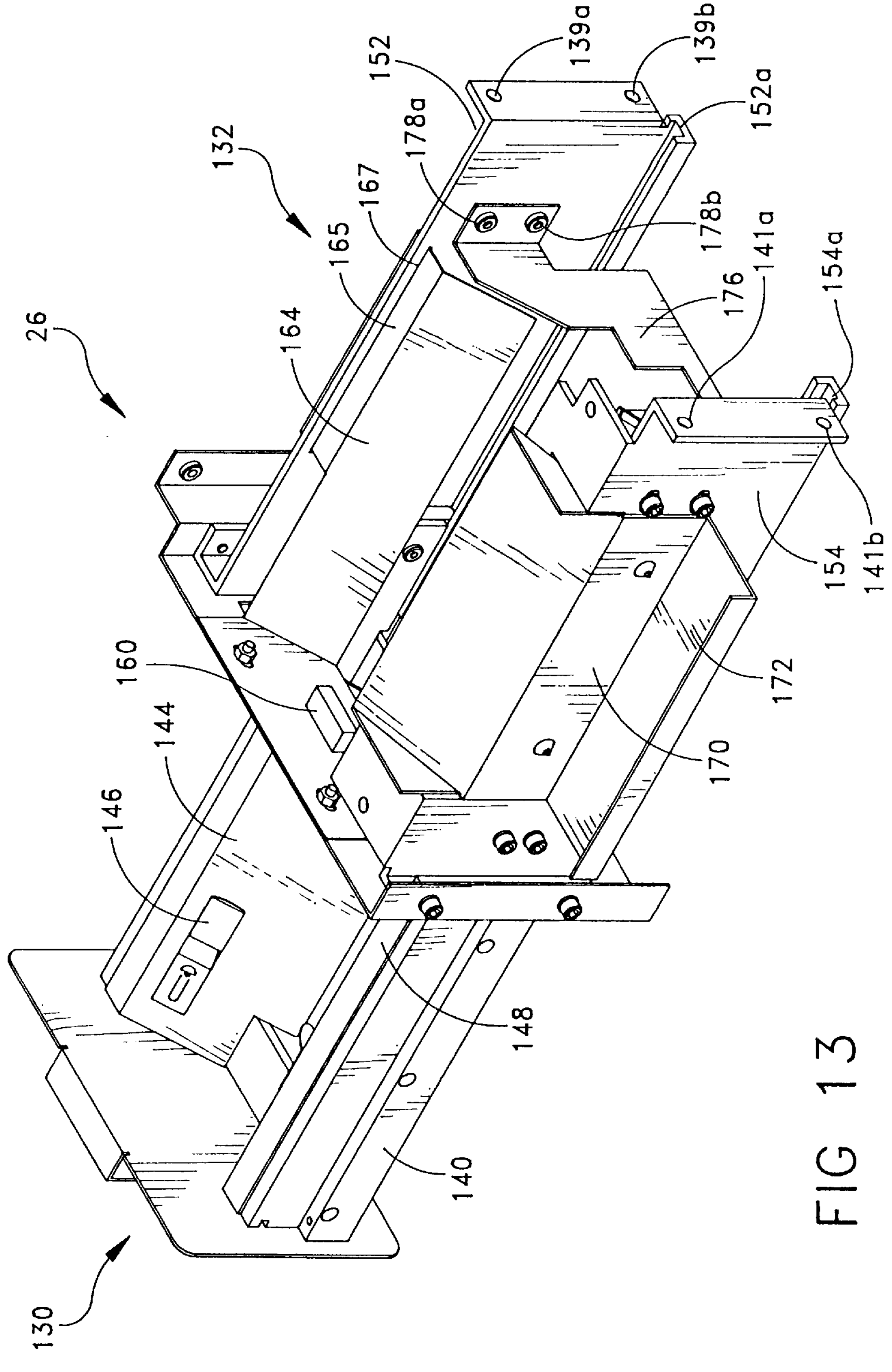
FIG. 13 is a right rear perspective view of the booklet drawer system of the apparatus of the present invention.

Drawer system 26 will now be described with reference to FIGS. 2, 12 and 13. Drawer system 26 includes a drawer 130 and a drawer retaining device 132. Drawer 130 includes a front plate 134 having a handle 136, left drawer rail 138 and right drawer rail 140. Front plate 134 is attached to left drawer rail 138 and right drawer rail 140 by bolts 142*a* and 142*b*. Left booklet slide 144 is mounted to left drawer rail 138 and includes a clip 146 which is slidably attached thereto. Right booklet slide 148 is mounted to right drawer rail 140 and includes a clip 150 slidably attached thereto. Drawer retaining device 132 includes left rail retainer 152, including left runner 152*a*, and right rail retainer 154, including right runner 154*a*. Left drawer rail 138 is received by left runner 152*a* and right drawer rail 140 is received by right runner 154*a*. Left rail retainer 152 includes mounting holes 139*a* and 139*b* for mounting left rail retainer 152 to wall 200 of apparatus 10 and right rail retainer 154 includes mounting holes 141*a* and 141*b* for mounting right rail retainer 154 to wall 200 of apparatus 10. Left rail retainer 152 and right rail retainer 154 are each coupled to frame 156. A top booklet guide 158 is coupled to frame 156 by bolts 162*a* and 162*b*, and includes a magnetic lock device 160 for maintaining drawer 130 in the closed position by magnetically engaging front plate 134, a left top booklet guide 164 and a right top booklet guide 166. Left top booklet guide 164 includes a tab 165 which is inserted into a slot 167 in left rail retainer 152. A scrap slide 170 is coupled to right rail retainer 154 and includes a shelf 172 which holds scrap tray 174. An adjustable backstop 176 is slidably mounted to left rail retainer 152 by bolts 178*a* and 178*b*, which mount adjustable backstop 176 to left rail retainer 152 via slots 180*a* and 180*b*, respectively. Bolts 178*a* and 178*b* may be slid back and forth in slots 180*a* and 180*b* to adjust the depth of the drawer retaining device 132, thereby allowing different size booklets to be used. A booklet position sensor 182 is mounted on adjustable backstop 176 and includes a mechanical sensor which determines whether a booklet is fully inserted in drawer retainer 132 against adjustable backstop 176.

Figure 10:
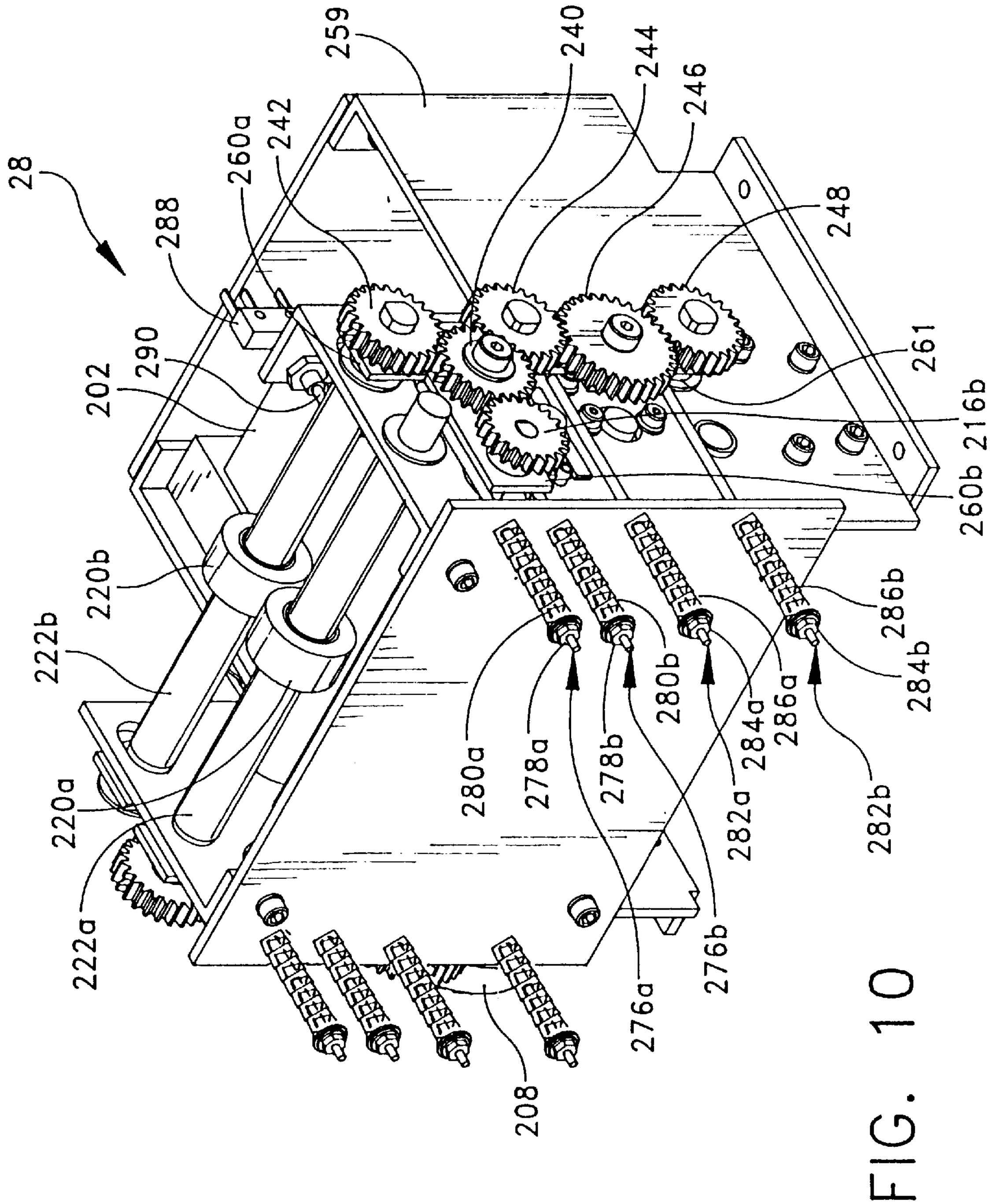
FIG. 10 is a left front perspective view of the laminating station of the apparatus of the present invention.
Figure 11:
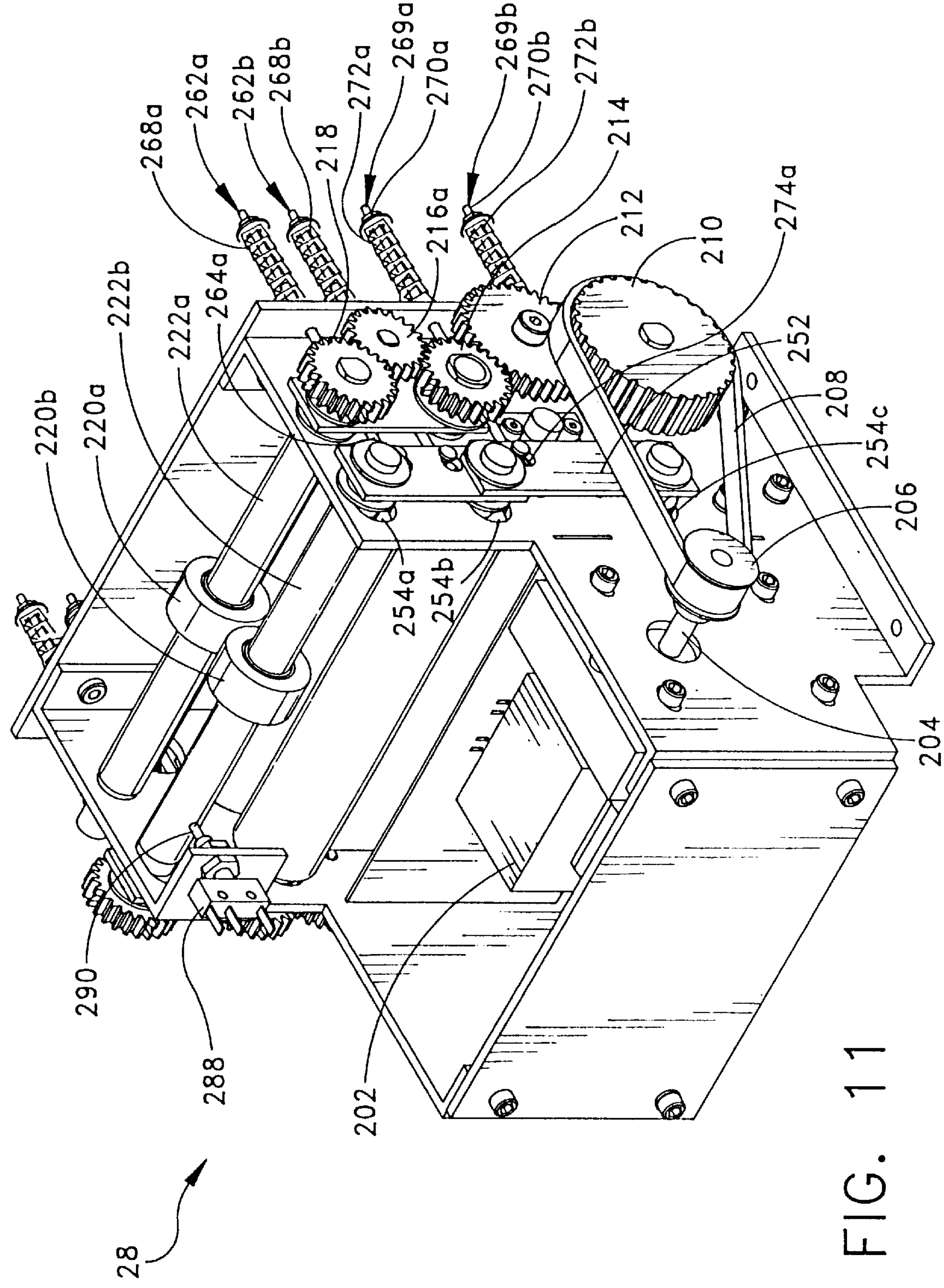
FIG. 11 is a right rear perspective view of the laminating station of the apparatus of the present invention.

Laminating station 28 will now be described with reference to FIGS. 2, 10 and 11. Laminating station 28 includes a series of nips and rollers which advance the booklet and identification card into a heat source and then out from the heat source. A first roller stage comprises nips 220*a* and 220*b* which are mounted on rollers 222*a* and 222*b*, respectively, and each include a one-way clutch mechanism which only allows the nips to rotate toward the center of the laminating station in order to pull the booklet from the drawer system 26 and into a second roller stage, which comprises a heated roller 224*a* and a cooperating guide roller 224*b*. A third roller stage comprises exit rollers 226*a* and 226*b*. Laminating station also includes heating plate 228*a* and a cooperating guide plate 228*b* and exit guides 230*a* and 230*b* for guiding the finished product from laminating station 28 via exit slot 232. In a preferred embodiment, heating plate 228*a* is coated with a non-stick material, such as SILVER STONE, to prevent the cover or backing films from sticking to it as the booklets are heated. Rollers 222*a*, 224*a* and 226*a* and heating plate 228*a* are fixedly mounted within laminating station 28, while rollers 222*b*, 224*b* and 226*b* are rotatably mounted within laminating station 28 by a floating linkage which will be described in detail below. Guide plate 228*b* is also floatably mounted within laminating station 28 and is biased against heating plate 228*a* by spring 234 which is mounted to wall 236 of laminating station 28.

An AC gear motor 202 drives driveshaft 204 having a pulley 206 mounted thereon. A belt 208 is mounted between pulley 206 and a drive gear 210. Drive gear 210 directly drives exit roller 226*a* and includes an internal gear (not shown) which drives idler gear 212. Idler gear 212 drives second roller stage gear 214, which directly drives heated roller 224*a*. Second roller stage gear 214 also drives primary drive transfer gear 216*a,* which drives drive transfer shaft 238, which drives secondary drive transfer gear 216*b* on the front of laminating station 28. Primary drive transfer gear 216*a* also drives first roller stage gear 218, which drives roller 222*a,* and consequently, nip 220*a.* Secondary drive transfer gear 216*b* drives idler gear 240, which drives first stage roller gear 242, which drives roller 222*b,* and consequently, nip 220*b.* Idler gear 240 also drives second stage roller gear 244, which drives guide roller 224*b.* Second stage roller gear 244 drives idler gear 246, which drives third stage roller gear 248, which drives exit roller 226*b.*

As discussed above, rollers 222*b,* 224*b* and 226*b* are mounted within laminating station 28 by means of a floating linkage. The floating linkage comprises link 250 which connects the non-geared ends of rollers 222*b* and 224*b,* and a link 252 which connects the non-geared ends of rollers 224*b* and 226*b.* Rollers 222*b,* 224*b* and 226*b* are mounted in slots 254*a,* 254*b* and 254*c,* respectively, which allow rollers 222*b,* 224*b* and 226*b* to float toward and away from fixed rollers 222*a,* 224*a* and 226*a,* respectively. In a similar manner, the geared ends of rollers 222*b,* 224*b* and 226*b* are mounted through slots in the front wall 259 of laminating station 28 and are interconnected by means of a floating linkage. The geared ends of rollers 222*b* and 224*b* are interconnected by a link 260*a,* and the geared ends of rollers 224*b* and 226*b* are interconnected by a link 261. Furthermore, the end of drive transfer shaft 238 on which drive transfer gear 216*b* is mounted is interconnected to the shaft (not shown) on which idler gear 240 is mounted by a link 260*b,* which is formed integrally with link 260*a.* Pressure adjustment spring systems 262*a* and 262*b* comprise rods 264*a* and 264*b* and springs 268*a* and 268*b,* respectively. Rods 264*a* and 264*b* are coupled to link 250 through slots 266*a* and 266*b,* respectively. Pressure adjustment spring systems 269*a* and 269*b* comprise rods 270*a* and 270*b* and springs 272*a* and 272*b,* respectively. Rods 270*a* and 270*b* are coupled to link 252 through slots 274*a* and a second slot in link 252 (not shown), respectively. Likewise, pressure adjustment spring systems 276*a,* 276*b,* which comprise rods 278*a* and 278*b* and springs 280*a* and 280*b,* respectively, and pressure adjustment spring systems 282*a* and 282*b,* which comprise rods 284*a* and 284*b* and springs 286*a* and 286*b,* respectively, are coupled to links 260*a* and 261. Pressure adjustment spring systems 262*a,* 262*b,* 269*a,* 269*b,* 276*a,* 276*b,* 282*a* and 282*b* operate to bias rollers 222*b,* 224*b* and 226*b* against rollers 222*a,* 224*a* and 226*a,* respectively. The amount of pressure between the rollers can be adjusted by the pressure adjustment spring systems, in order to allow booklet of varying thicknesses to be used with the present invention. Laminating station 28 also comprises a switch 288 having a mechanical sensor 290 which contacts roller 222*b* and determines when a booklet has passed through nips 220*a* and 220*b,* by the movement of roller 222*b* as the booklet passes through nips 220*a* and 220*b.*

Figure 3:
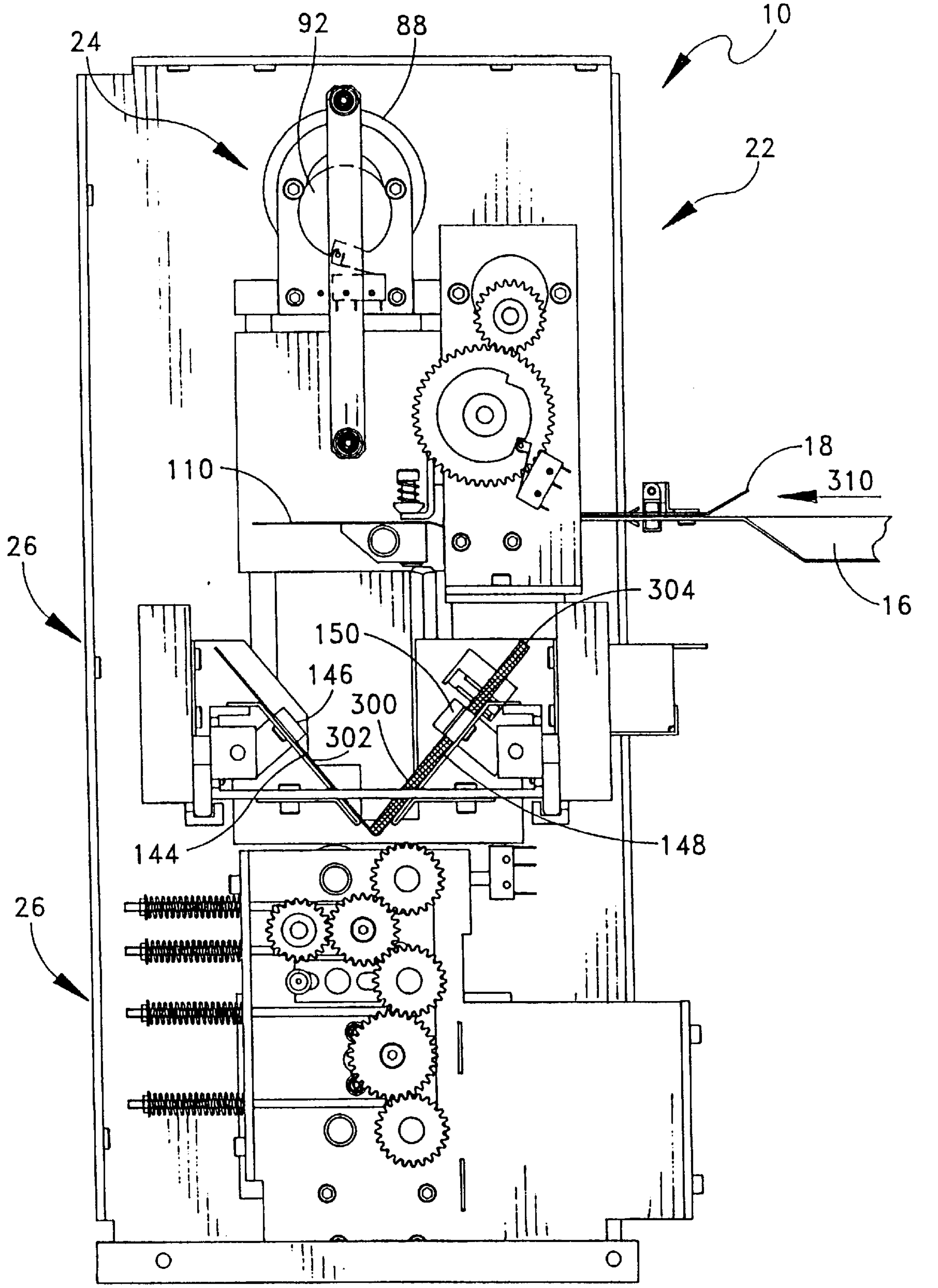
FIGS. 3–7 are front views of the apparatus of the present invention, showing the operation of the apparatus.
Figure 4:
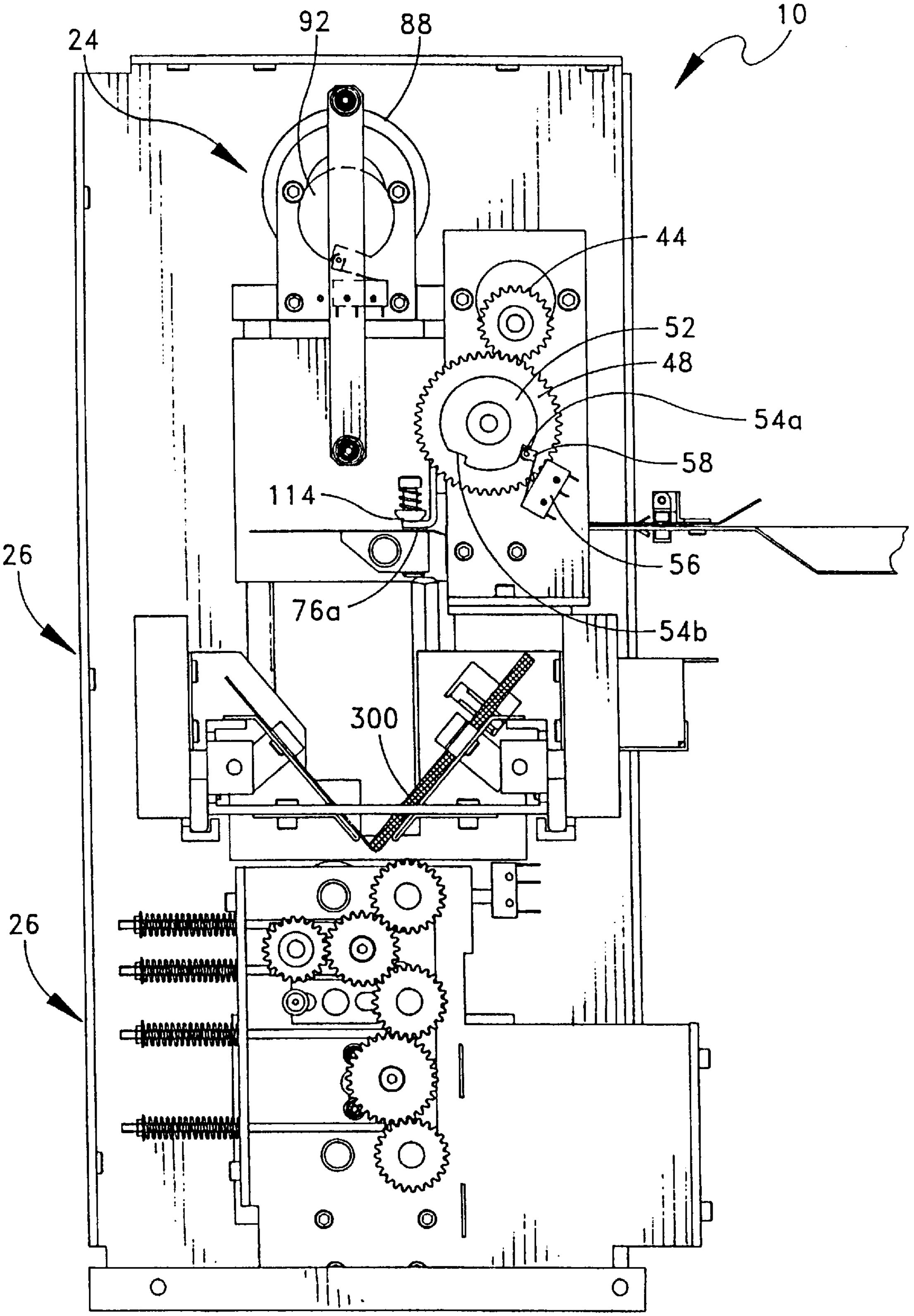

The operation of the apparatus 10 will now be described with reference to FIGS. 3–7 and 15. For simplicity, the top booklet guide 158, drawer front plate 134 and pedestal 14 are not shown in FIGS. 3–7. As shown in FIG. 3, drawer 130 is removed from drawer retainer device 132, and a booklet 300 is inserted into drawer 130 and held against left and right booklet slides 144 and 148 by dips 146 and 150, respectively. As described above, booklet 300 includes a cover and a backing film 302 bound into the binder of booklet 300 to form a page therein. Booklet 300 also includes a plurality of paper pages 304 bound therein. Booklet 300 is inserted into drawer 130 such that backing film 302 is exposed and clipped under clip 146 of left booklet slide 144. Drawer 130 is then inserted into drawer retaining device 132, such that booklet 300 rests against backstop 176 and booklet position sensor 182.

Figure 15:
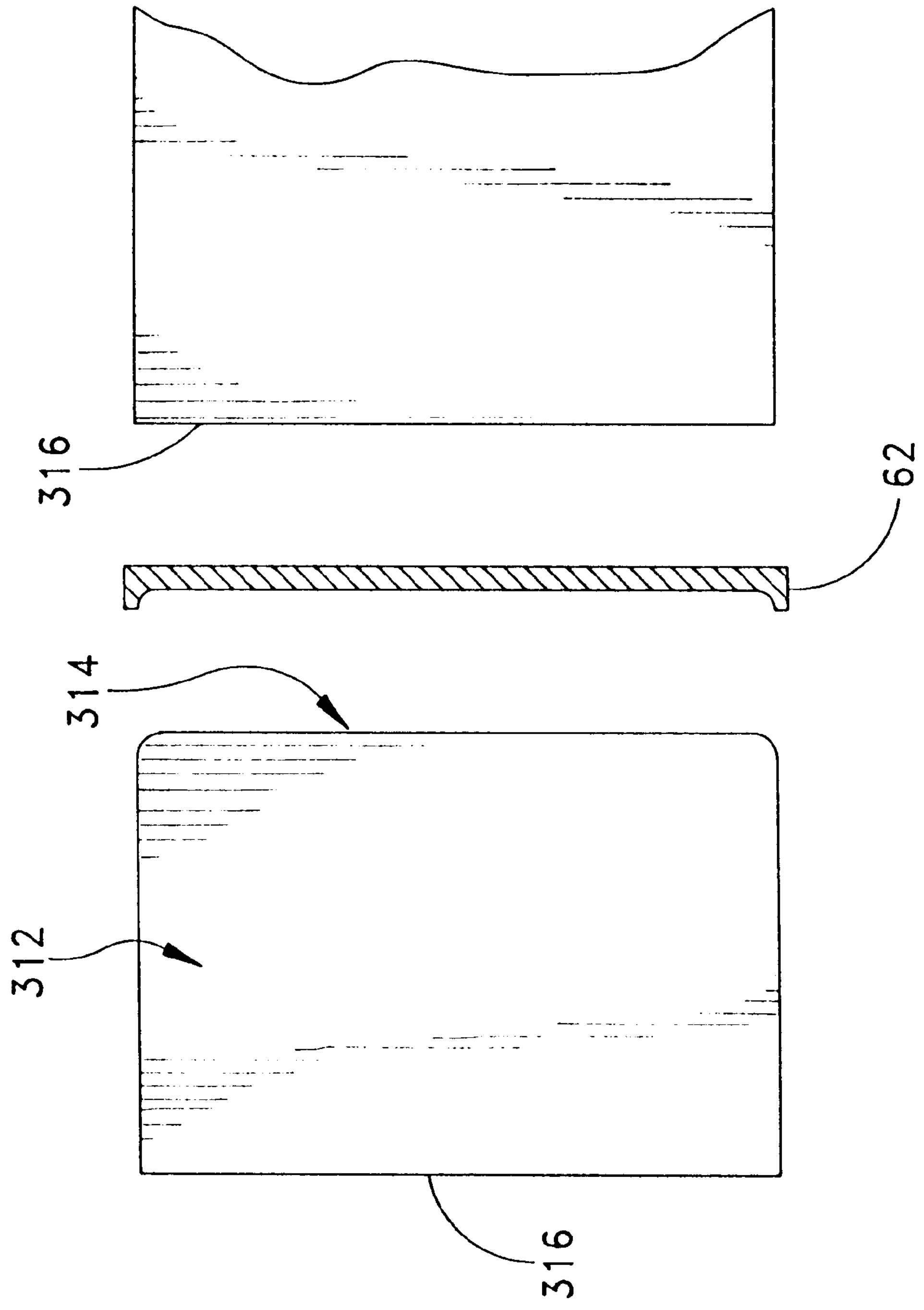
FIG. 15 is a cross-sectional view of the die of the apparatus of the present invention, showing the type of cut made by the die.

The cover film, after being printed on as described above, is advanced in the direction of arrow 310 between lower media guide 16 and upper media guide 18 into die-cutting station 22. The terminal end of the cover film is advanced to the distal edge of blade 110 of transport station 24. Motor 38 then rotates drive gear 44 which rotates secondary gear 48, turning two position cam 52, and consequently, cam shaft 50 in the counter-clockwise direction, FIG. 4. Cams 60*a* and 60*b* depress cam followers 72*a* and 72*b,* driving die 62 into the cover film, thereby cutting the cover film. FIG. 15 shows the type of cut performed by die 62. In FIG. 15, a cross-section of die 62 is shown, and also shows the resulting cut cover film. As is shown in FIG. 15, die 62 punches out a portion of the terminal end of the cover film to form an identification card 312 having rounded comers on one edge 314 thereof. Identification card 312 is approximately the same width and length as a page of booklet 300. Opposite edge 314, a straight edge 316 is formed on the new terminal end of the cover film. The scrap piece of cover film which is punched out by die 62 falls through slot 66*a* in beam 66 into scrap tray 174 via scrap slide 170. As shown in the figure, card 312 also includes a flat edge 316. As die 62 is driven downwardly into the cover film, die holder 64 also is driven down, causing clamp-actuating bar 74 to also be driven downwardly. Consequently, fingers 76*a* and 76*b* release clamp bar 114, thereby clamping identification card 312 to blade 110 of transport station 24. Mechanical sensor 58 stops motor 38 from rotating camshaft 50 when it is received in detent 54*a* of two position cam 52.

Figure 5:
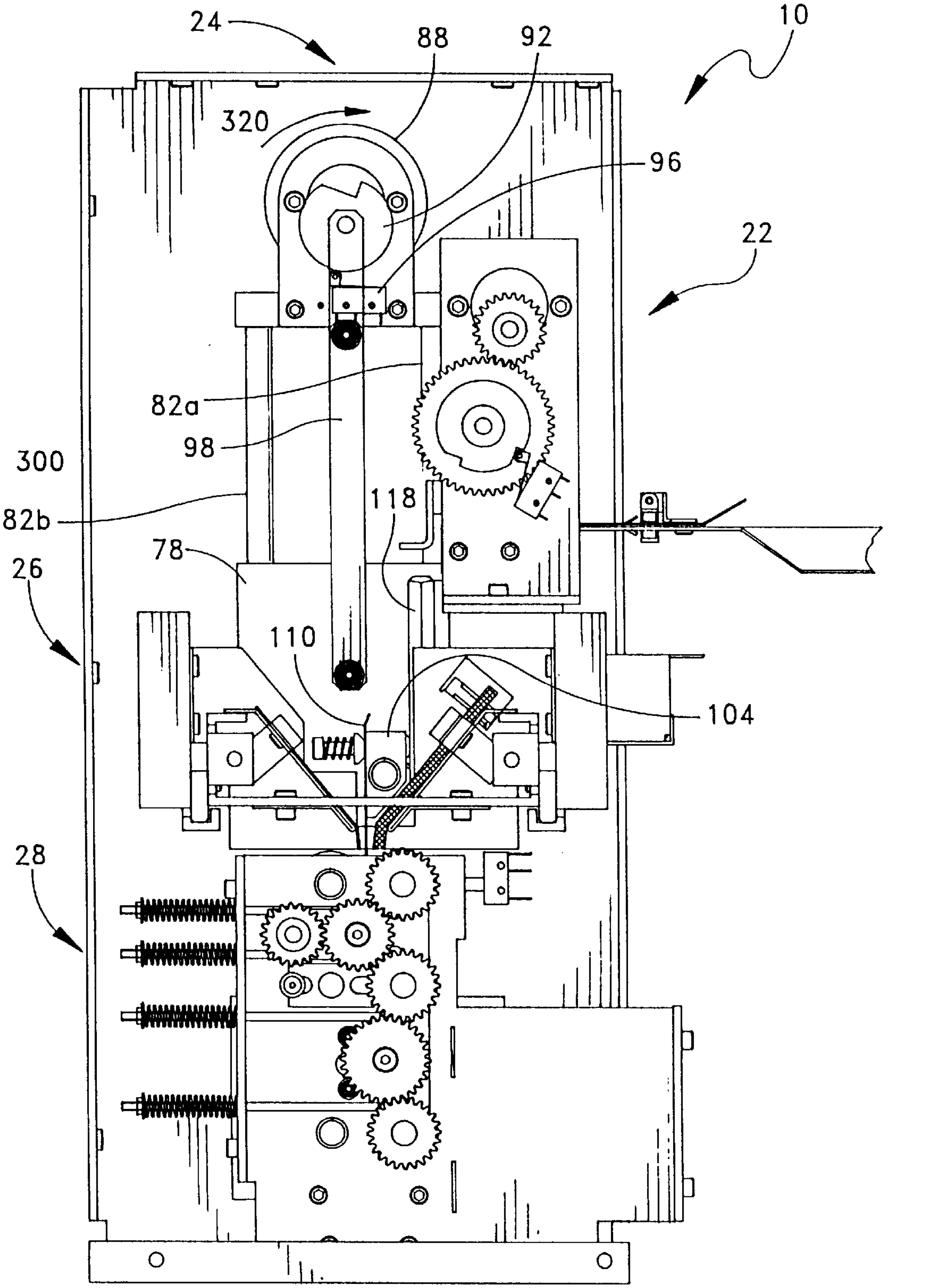
Figure 6:
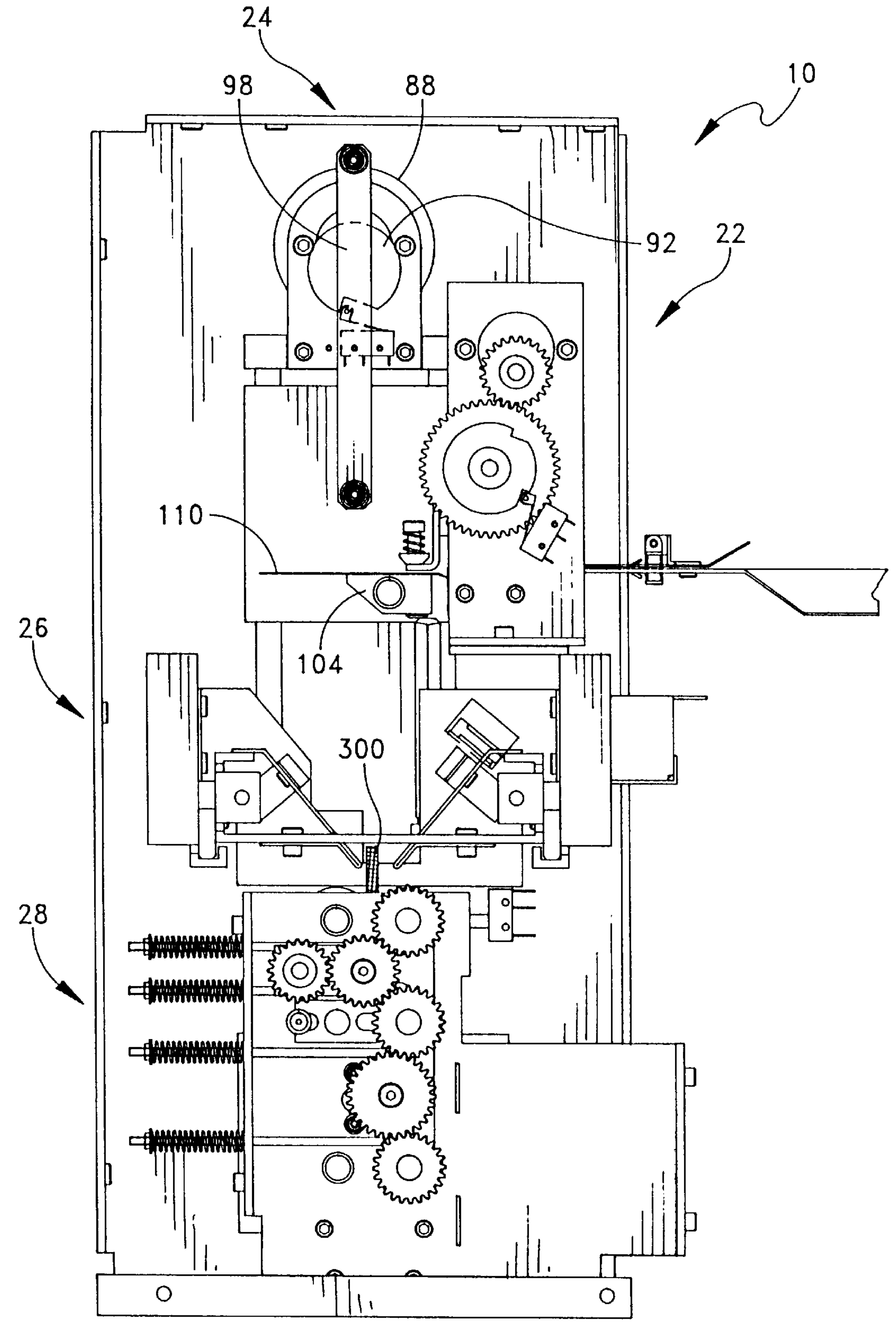
Figure 7:
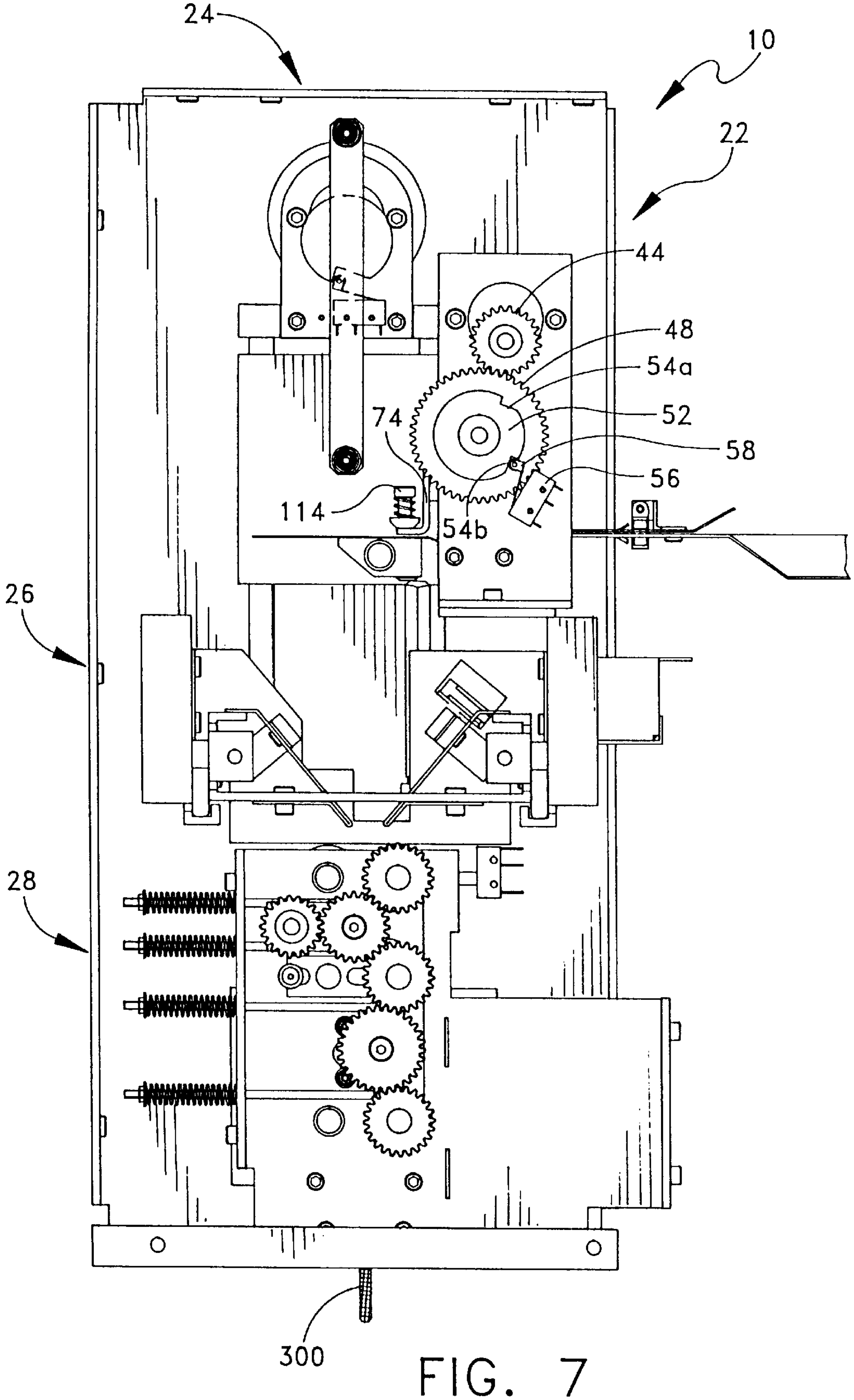

Motor 88 of transport station 24 then rotates cam 92 in the direction indicated by arrow 320, FIG. 5, causing link 96 to turn in the same direction, thereby pushing link 98 and, consequently vertical slide carriage 78 downward. Tilt tray actuator 118 causes tilt tray 104 to rotate 90° downward about shaft 106, as vertical slide carriage 78 and tilt tray 104 are pushed downward by link 98. Tilt tray 104 and blade 110 are held in place in the vertical orientation by maintaining contact with tilt tray actuator 118 while tilt tray 104 is driven downward. Blade 110, with identification card 312 clamped thereto, is driven into the binder of booklet 300, bringing identification card 312 into contact with backing film 302 with straight edge 316 of identification card 312 being proximate the binder, and edge 314, with the rounded corners, being located opposite the binder. The side edges of the identification card 312 are aligned with the side edges of the backing film 302. Blade 110 pushes booklet along drawer booklet slides 144 and 148 into nips 220*a* and 220*b* of laminating station 28. Driven by motor 202, nips 220*a* and 220*b* receive booklet 300 from blade 110 in the area between extensions 110*b* and 110*c,* so that only booklet 300, including identification card 312, and not blade 110 is received between nips 220*a* and 220*b.* Motor 88 continues to rotate cam 92 until it makes a complete revolution and links 96 and 98 have pulled tilt tray 104 back to the horizontal position shown in FIG. 6. Motor 88 stops rotating cam 92 when sensor 93 is received in detent 92*a* and tilt tray 104 has returned to the horizontal position.

Booklet 300, having identification card 312 in contact with backing film 302, is passed from nips 220*a* and 220*b* to heated roller 224*a* and roller 224*b,* which passes booklet 300 between heating plate 228*a* and guide plate 228*b.* Roller 224*a* is heated to a temperature of about 200° C., and performs an initial lamination of the identification card 312 to the backing film 302, while removing air from between identification card 312 and backing film 302. Heating plate 228*a* is heated to a temperature of about 160° C. to define a full laminating stage. As the booklet is passes between rollers 224*a* and 224*b,* air bubbles are squeezed from between the identification card 312 and the backing film 302 as they are initially heated by roller 224*a.* After the initial lamination, booklet 300 is passed between heated plate 228*a* and guide plate 228*b,* and identification card 312 and backing film 302 are heated for a longer duration and are fully fused together. Rollers 226*a* and 226*b* remove booklet 300, with identification card 312 and backing film 302 completely fused together, from between heated and guide plates 228*a* and 228*b,* and pass the finished product through exit slot 232, guided by exit guides 230*a* and 230*b,* FIG. 7. While booklet 300 is being laminated in laminating station 28, motor 38 of die-cutting station 22 rotates camshaft 50 in the counterclockwise direction to raise die 62, and consequently, clamp-actuating bar 74. Two position cam 52 rotates until mechanical sensor is received by detent 54*b,* which signals motor 38 to cease rotating camshaft 50. The cover film is then retracted by the printer 12, and the next identification card is printed, as described above.

Mechanical sensor 290 of switch 288 senses the movement of booklet 300 through nips 220*a* and 220*b* and notifies the operator when booklet 300 has passed through nips 220*a* and 220*b,* so that another booklet can be loaded into drawer system 26, while the next identification card is printed. The above-described process is then repeated to form another passport booklet in accordance with the invention.

It can therefore be seen that the present invention provides a novel apparatus for instant, one-up printing, die-cutting and laminating of passport booklets from two-part security media. The apparatus 10 provides a thermal web printing device 12, for thermally printing a digital card image onto the security media, die-cutting apparatus 22 for die-cutting a predetermined sized identification card, drawer apparatus 26 for holding the booklet in place, transport apparatus 24 for transporting the identification card into the booklet, laminating apparatus 28 for fusing the security media together and the appropriate guide and advancing mechanisms for guiding and advancing the security media and booklet through the die-cutting, transport and laminating apparatus. The apparatus 10 is quick and efficient and therefore it provides a convenient and cost-effective means for instant custom production of passport booklets. For these reasons, the present invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept. For example, while the invention is disclosed as being for producing passport booklets, any type of booklets may be produced by the present invention, including bank account booklets, visas and novelty booklets. Therefore, the underlying inventive concept is not limited to the particular forms herein shown and described except insofar as indicated by the scope of the appended claims.

What is claimed is:

1. An automated apparatus for fusing a cover film to a backing, said cover film having indicia printed thereon, said apparatus comprising:

fusing means for fusing said cover film and said backing together;

transport means including a rotatable insertion blade; and clamp means disposed on said rotatable insertion blade for clamping said cover film to said rotatable insertion blade, wherein said transport means causes said rotatable insertion blade to rotate, transports said cover film into contact with said backing, said cover film being disposed between said backing and said rotatable insertion blade, said transport means transporting said cover film and backing into said fusing means, wherein said cover film and said backing are fused together.

2. The apparatus of claim 1 further comprising die-cutting means disposed adjacent said clamp means for cutting rounded corners in said cover film wherein, as said clamp means clamps said cover film to said rotatable blade, said die-cutting means cuts said rounded corners in said cover film.

3. The apparatus of claim 1 wherein said backing is integrally formed within a booklet, said cover film being transported into said booklet and into contact with said backing by said transport means, said booklet then being transported into said fusing means by said transport means.

4. The apparatus of claim 3 wherein said fusing means comprises a first pair of rollers for receiving said booklet therebetween from said transport means, heating means disposed downstream of said first pair of rollers for heating said booklet, and thereby fusing said cover film and said backing together, and a second pair of rollers downstream of said heating means, wherein said first pair of rollers feeds said booklet into said heating means and said second pair of rollers removes said booklet from said heating means.

5. The apparatus of claim 4, wherein said booklet is a passport.

6. The apparatus of claim 1 further comprising a printer for printing said indicia on said cover film, said printer comprising a thermal printing device which prints in a reverse direction.

7. The apparatus of claim 1 wherein edges of said cover film are registered to edges of said backing by said rotatable insertion blade.

8. An apparatus for forming and attaching an identification card in a booklet, said booklet having a backing attached therein, said identification card comprising a cover film, the apparatus comprising:

means for holding said booklet in an open position with said backing exposed;

printing means for printing indicia onto an inner surface of said cover film;

transport means including an insertion blade rotatably mounted thereon, said insertion blade including a clamp for holding said cover film in place thereon;

die-cut means for cutting said cover film to a predetermined size while said cover film is held in place on said insertion blade by said clamp, to form said identification card; and fusing means for fusing said identification card and said backing together;

wherein said insertion blade is rotated while said transport means transports said insertion blade with said identification card clamped thereto into said booklet, with said identification card contacting said backing; and wherein said transport means pushes said booklet into said fusing means with said insertion blade, and said fusing means fuses said identification card to said backing.

9. The apparatus of claim 8, wherein said insertion blade is rotated from a horizontal orientation to a vertical orientation.

10. The apparatus of claim 9, wherein said fusing means comprises a first pair of rollers, heating means disposed downstream of said first pair of rollers and a second pair of rollers disposed downstream of said heating means, wherein said first pair of rollers receives said booklet, including said backing and said identification card, from said insertion blade of said transport means, and transfers said booklet to said heating means, which fuses said identification card to said backing, and wherein said second pair of rollers receives said booklet from said heating means and transfers said booklet out of said fusing means.

11. The apparatus of claim 10, wherein said transport means comprises a rotary linkage for transporting said insertion blade into said booklet.

12. The apparatus of claim 8, wherein edges of said identification card are registered to edges of said backing by said insertion blade.

13. An apparatus for the automated assembly of an identification booklet from a two part security media comprising a backing material and a cover film, said backing material being secured within said identification booklet, said cover film comprising a continuous web of cover film, said cover film receiving a printed image thereon, the apparatus comprising:

a printer, said printer printing a printed image on a terminal end portion of said continuous web of cover film;

a cutting device;

a film advancing device, said film advancing device advancing said terminal end portion of said continuous web of cover film from said printer to said cutting device, said cutting device severing said terminal end portion of said cover film to form a patch to be assembled with said booklet;

a laminating assembly; and a transport assembly including an insertion blade, said insertion blade receiving said patch and inserting said patch into said booklet in facing relation with said backing material, said transport assembly pushing said booklet into said laminating assembly wherein said patch and said backing material are permanently fused together by heat.

14. The apparatus of claim 13 wherein said patch is cut with a straight edge for alignment with an inner binding of the booklet, and an opposing edge with rounded corners.

15. The apparatus of claim 13 further comprising a booklet holding device for holding said booklet in an open position for receiving said patch of cover film, said booklet holding device having a bottom opening for allowing said booklet to be pushed therethrough.

16. The apparatus of claim 15 wherein said booklet holding apparatus holds said booklet in an open position with the backing material exposed for alignment with said cover film.

17. An apparatus for the automated assembly of an identification booklet from a two part security media comprising a backing material and a cover film, said booklet having said backing attached therein, said cover film receiving a printed image thereon, the apparatus comprising:

a printer for printing indicia on a terminal end portion of a continuous web of said cover film wherein said indicia is printed in reverse image on a side of the terminal end portion of the continuous web to be mated with the backing material, said indicia being visible in the correct orientation when viewed through the opposing side of the cover film;

a cutting device for severing said terminal end portion of said cover film to form said patch to be assembled with said booklet;

a transport assembly for inserting said patch into said booklet in facing relation with said backing; and a laminating assembly, said booklet passing through said laminating assembly wherein said patch and said backing are permanently fused together by heat.

18. The apparatus of claim 17 wherein said patch is cut with a straight edge for alignment with an inner binding of the booklet, and an opposing edge with rounded corners.

19. The apparatus of claim 17 further comprising a booklet holding device for holding said booklet in an open position for receiving said patch of cover film.

20. The apparatus of claim 19 wherein said booklet holding apparatus holds said booklet in an open position with the backing material exposed for alignment with said cover film.

* * * * *